United States Patent [19]

Hansson

[11] Patent Number: 4,540,309

[45] Date of Patent: Sep. 10, 1985

[54] ATTACHMENT DEVICE

[76] Inventor: Erik G. Hansson, Stughemmet, S-562 42 Sandhem, Sweden

[21] Appl. No.: 514,955

[22] Filed: Jul. 18, 1983

[30] Foreign Application Priority Data

Jul. 20, 1982 [SE] Sweden .............................. 8204399

[51] Int. Cl.³ .............................................. F16B 2/14
[52] U.S. Cl. ................. 403/374; 403/406.1; 403/409.1; 24/573; 5/289
[58] Field of Search .............. 403/409, 252, 406, 289, 403/374, 310; 249/165, 166, 46; 24/573, 459, 535, 517, 483; 292/295; 5/289, 288

[56] References Cited

U.S. PATENT DOCUMENTS

| | | | |
|---|---|---|---|
| 1,021,185 | 3/1912 | Foster | 5/289 |
| 1,095,636 | 5/1914 | Hummer | 403/407 |
| 1,431,527 | 10/1922 | Kane | 403/409 X |
| 1,757,462 | 5/1930 | Mack | 24/573 X |
| 2,649,126 | 8/1953 | Tinnerman | 403/406 X |
| 2,661,516 | 12/1953 | Yates | 249/7 |
| 2,731,700 | 1/1956 | Yates | 249/7 |
| 2,974,703 | 3/1961 | Rapata | 403/406 X |
| 3,062,279 | 11/1962 | Kochanowski | 292/300 |
| 3,201,841 | 8/1965 | Carleton | 24/459 |
| 4,133,085 | 1/1979 | Hansson . | |
| 4,167,355 | 9/1979 | Hansson . | |
| 4,189,810 | 2/1980 | Bezlat | 24/517 X |
| 4,380,102 | 4/1983 | Hansson . | |

FOREIGN PATENT DOCUMENTS 454759  3/1949  Canada .............................. 403/247

Primary Examiner—Cornelius J. Husar
Assistant Examiner—Todd G. Williams
Attorney, Agent, or Firm—Cushman, Darby & Cushman

[57] ABSTRACT

An attachment device comprises a conical screw and a hook which fits thereto with a curved center portion having a slot extending in the length direction of the hook. A plate can be engaged in said slot so that an aperture in the plate located near the edge thereof partly reaches inside the hook, whereafter the screw can be inserted therein. The screw then engages the edge of the aperture and the concave portion of the hook. The hook itself is inserted through an aperture in a rail and is held against one of its sides, so that the plate is drawn perpendicularly against the opposite side of the rail.

20 Claims, 21 Drawing Figures

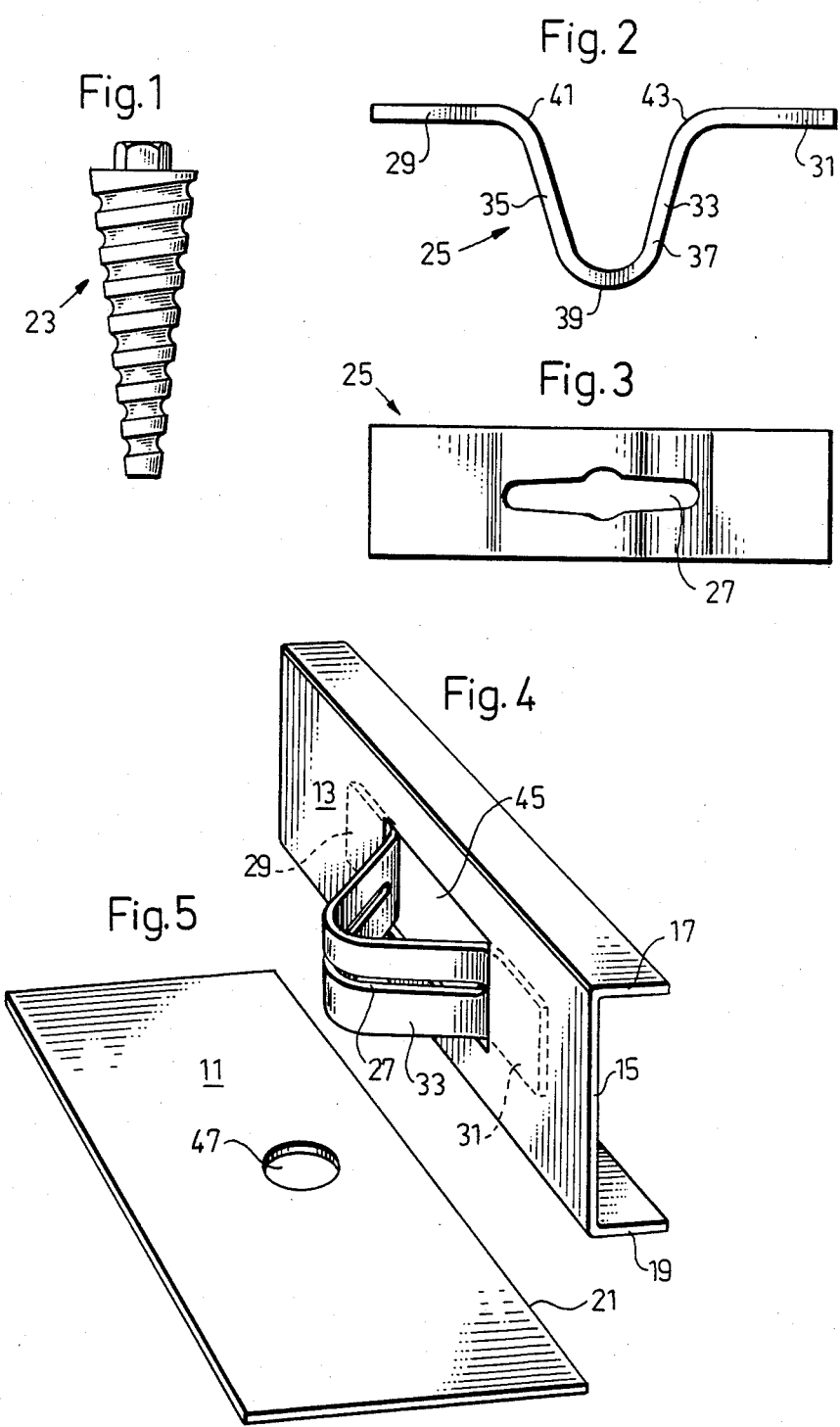

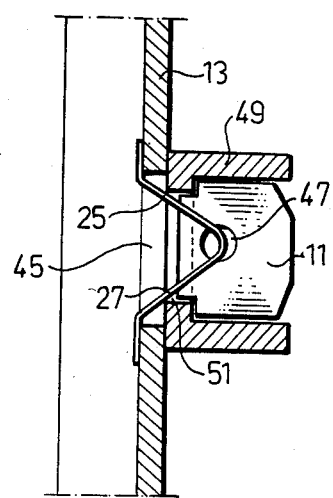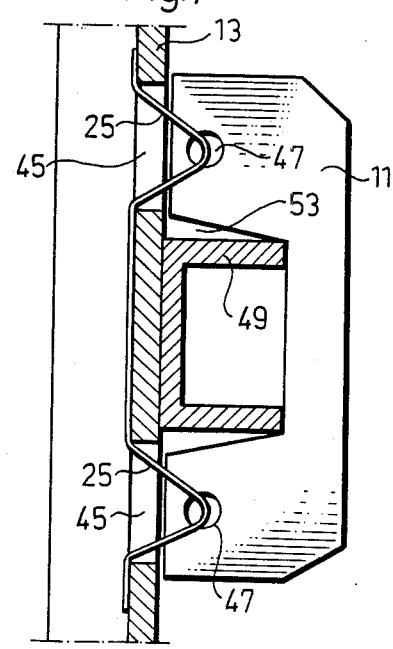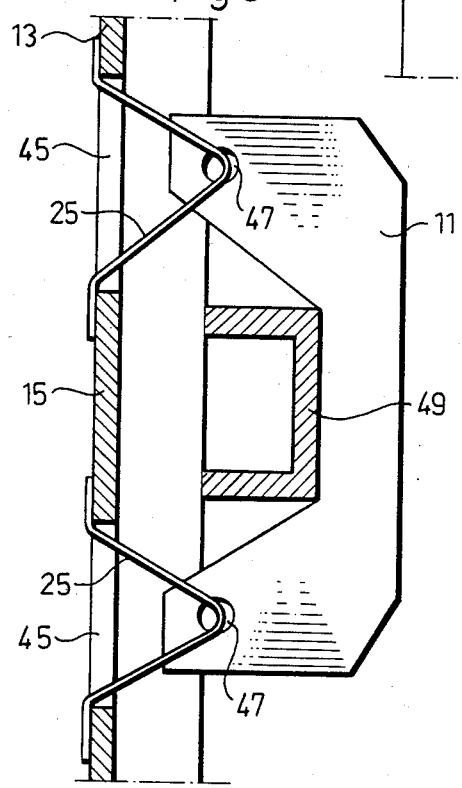

ATTACHMENT DEVICE

The present invention relates to an attachment device for holding various means, attached in a readily releasable manner, to rails having a flute-shaped profile. Such rails form part of scaffolding of various kinds and it is desired to provide for assembly, adjustment of the mutual position of and disassembly of the various parts with the minimum of work at the place of use, the connections nevertheless being sufficiently secure so that they cannot loosen inadvertently, e.g. due to vibration. In particular the present invention relates to enabling securing to a rail, having a flute-like profile, particularly a U-shaped profile, the edge of a plate set perpendicularly to the web of the rail.

According to the present invention there is provided an attachment device for holding the edge of a plate in a readily detachable manner, which is positioned perpendicularly to a web of a rail of a flute-shaped profile, comprising a hook strip having end parts to be held by the rail and having a curved centre part projecting therefrom in which a slot is cut into which the plate edge can be inserted, and a conical screw which is insertable through an aperture in the plate edge partly projecting into the slot and engage the edge of said aperture, whilst opposite said engagement, the screw is supported and guided by the concave face of the curved hook portion so that the plate edge and the rail are forced towards each other when the screw is advanced into the aperture.

Thus, the attachment device of the invention basically consists of two separate components, viz. a conical screw and a specially shaped hook. The conical screw is known in principle and has proved to give safe connections in other applications. The screw co-operates with the hook in order to safely maintain the edge of a plate applied perpendicularly against the side of a rail having a flute-like profile.

The attachment device according to the invention will be described further, by way of example, with reference to the accompanying drawings, in which:

FIG. 1 shows the conical screw from the side;

FIGS. 2 and 3 show an embodiment of the hook from two different directions;

FIG. 4 is a perspective view of the hook inserted into a rail;

FIG. 5 shows a plate, the edge of which should be attached to the rail;

Figure 9:
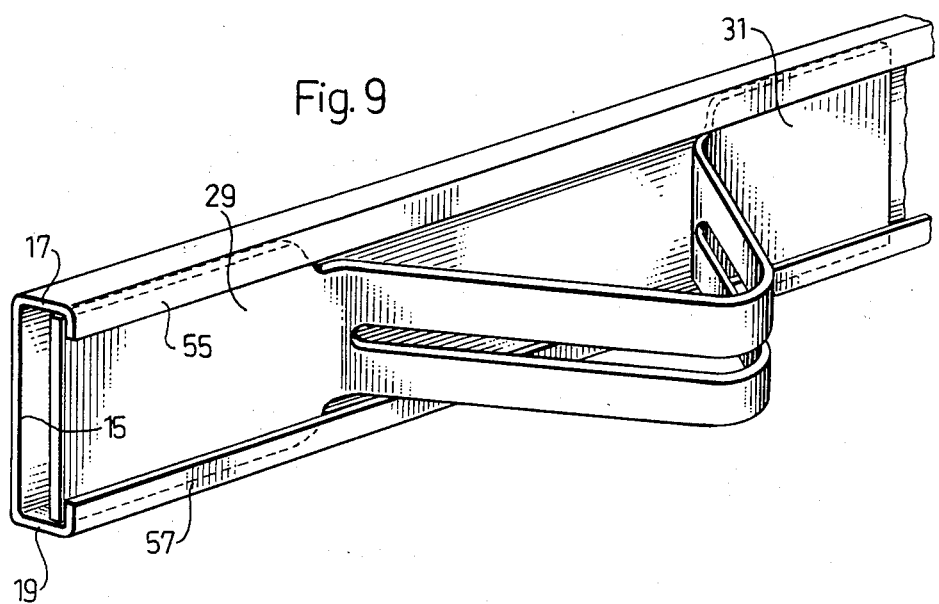
Figure 10:
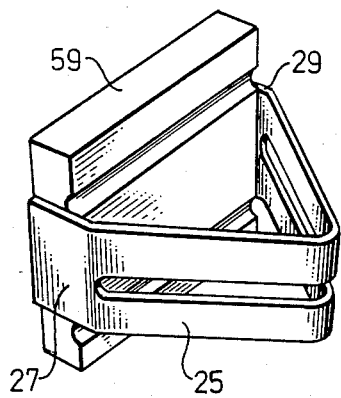
Figure 11:
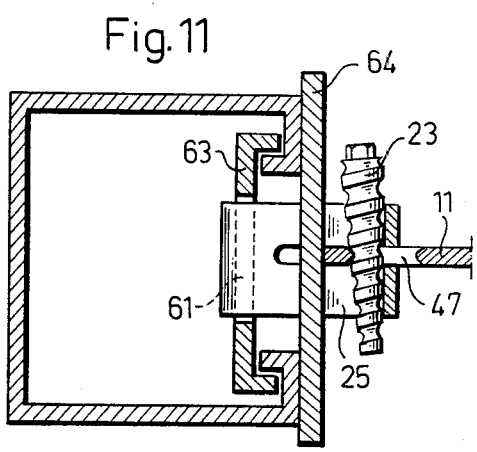

FIGS. 6, 7 and 8 diagrammatically show how it is possible, with the aid of the attachment device of the invention to grasp and hold between a rail and a plate perpendicular thereto a second rail extending transversely to the first-mentioned one;

FIG. 9 shows a modified embodiment of the hook inserted into a rail;

FIG. 10 shows a third embodiment of the hook attached to a slide;

FIG. 11 shows a cross-section of a rail having double-folded flanges and into which an inner rail carrying the hook is inserted.

Figure 12:
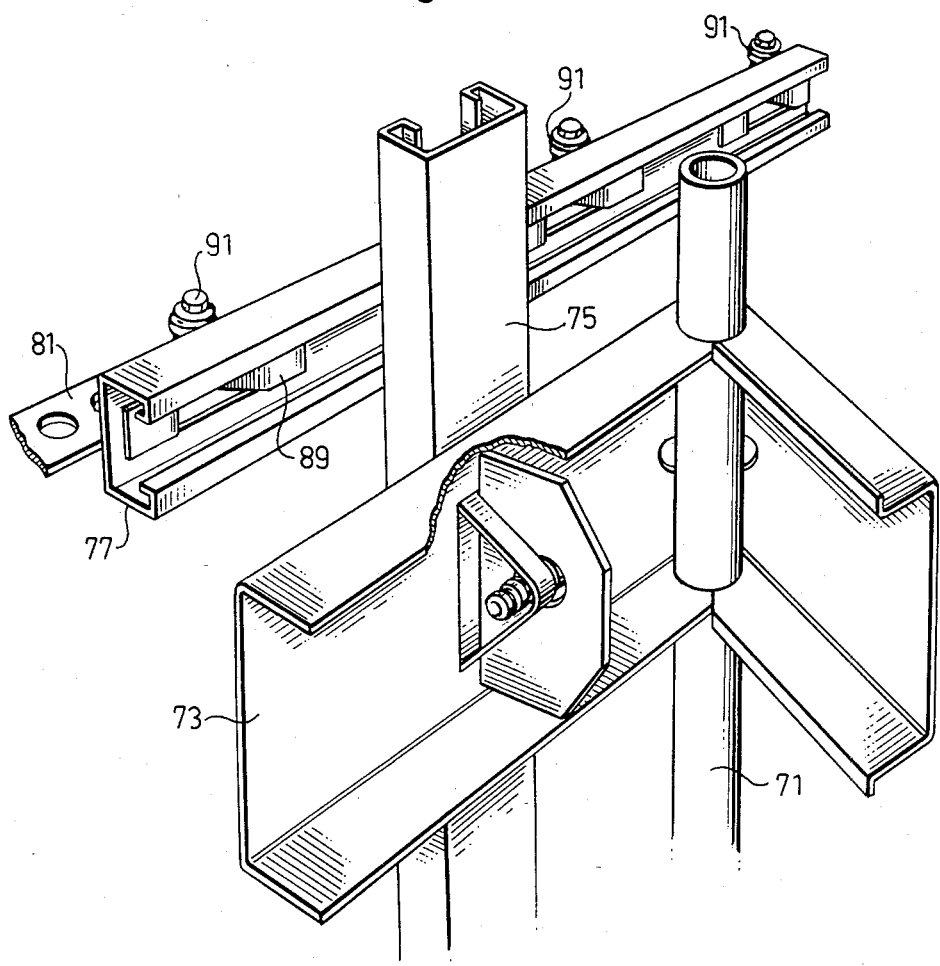
Figure 14:
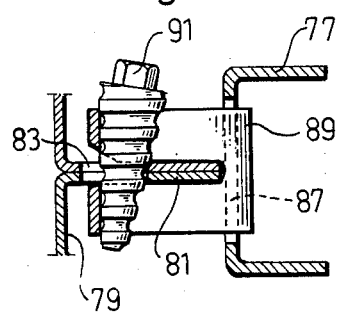
Figure 13:
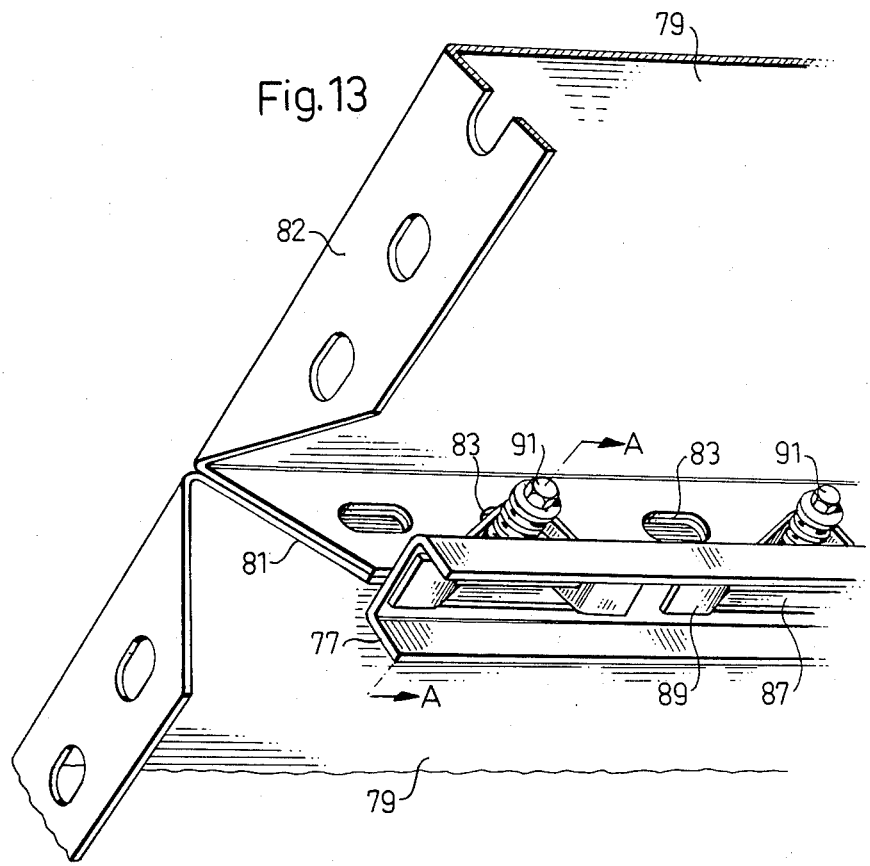
Figure 15:
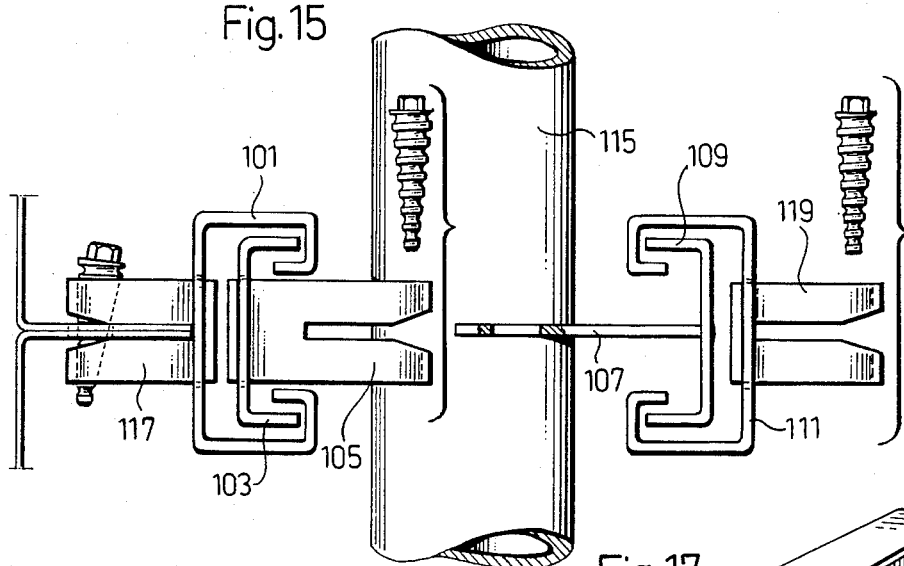
Figure 16:
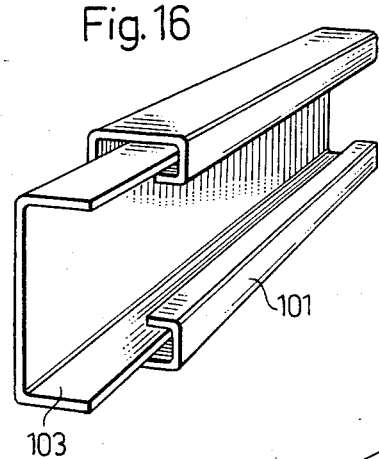
Figure 17:
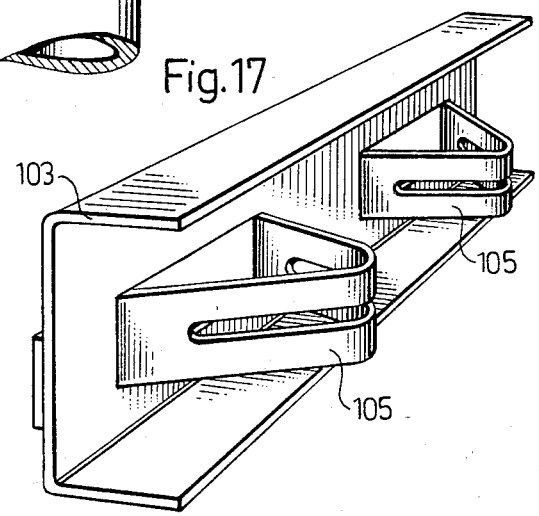
Figure 18:
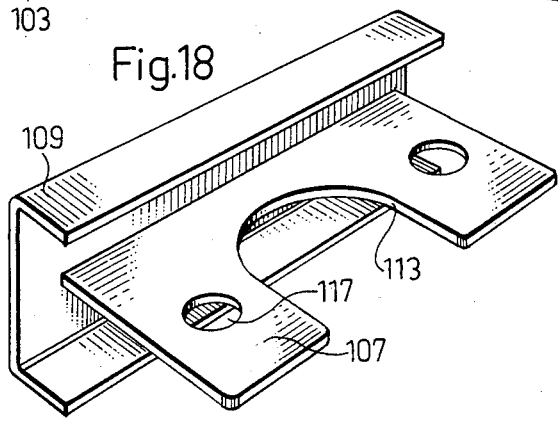

FIGS. 12 to 14 show the application of the inventive attachment device for securing and supporting road sign boards, FIG. 12 being a partial over-all picture, FIG. 13 showing a detail thereof at a greater scale, and FIG. 14 being a cross-sectional view taken along the line A—A in FIG. 13;

FIG. 15 shows the inventive attachment device in its use for securing a traffic sign board to a road pole;

FIGS. 16 to 18 show details forming parts thereof; and

Figure 19:
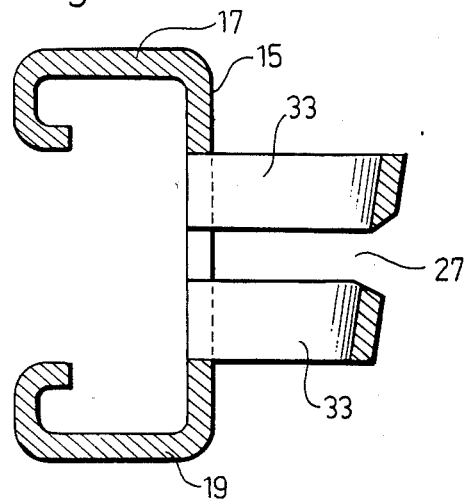
Figure 20:
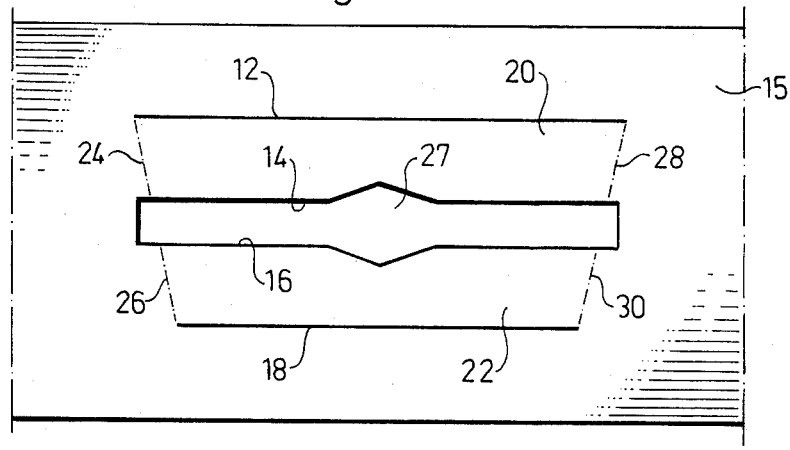
Figure 21:
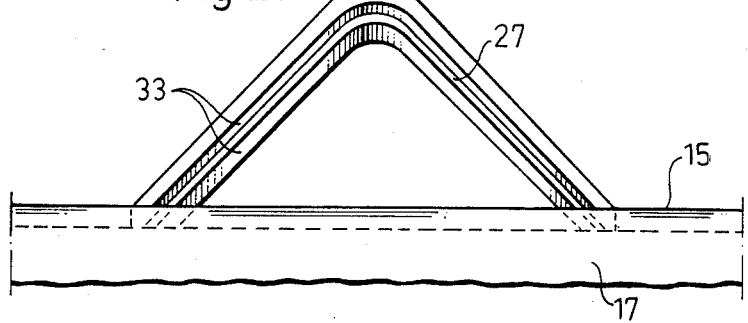

FIGS. 19, 20 and 21 show a hook united with the rail, in cross-section, from the side and from above, respectively.

Referring to the drawings, FIGS. 1 to 5 show a horizontal plate 11 which is to be fastened to a horizontally extending rail 13 of U-shaped profile, the vertical web 15 of which rail 13 has upper and lower flanges 17 and 19, respectively. The plate 11 is to be applied with its straight edge 21 against the web 15 of the rail 13 and held at right angles thereto. Attachment is performed by the screw 23 shown in FIG. 1, which is conically tapering and has a conical thread along its mantle face, and by the hook 25 shown in FIGS. 2 and 3. The hook 25 is formed from a flat sheet iron strip of uniform width having a slot 27 along its centre line and being bent into the shape shown with two oppositely directed end portions 29, 31 situated in the same plane and an intermediate curved centre portion 33. The latter portion 33 comprises two symmetrical, mutually angled substantially straight and flat parts 35, 37 which join each other via a rounded, preferably cylindrically curved center part 39 and join the end parts via further, acute bends or folds 41, 43.

In the web 15 of the rail 13 a rectangular aperture 45 is provided which is sufficiently large to allow the insertion of the entire centre portion 33 of the hook 25 therethrough, whilst the end portions 29, 31 abut the inside of longitudinal flute of the rail 13.

The aperture 45 may be so narrow that the hook 25 may be push fitted therein. Otherwise it may be useful to attach the hook 25, e.g. by spot welds. As an alternative, the aperture 45 may be oversized in order to allow some displacement and adjustment of the position of the hook 25.

During assembly, the plate edge 21 is inserted into the hook slot 27 sufficiently far so that the marginal zone of the plate 11 is supported on its upper as well as on its lower side and is held quite steadily in a horizontal position. The slot 27 extends almost up to the bent end parts of the hook 25, thereby allowing the edge 21 to abut closely against the rail web 15 along a great part of its length. In the plate 11 there is a substantially circular aperture 47 situated at such distance from the edge 21 that a part of the aperture 47 will be visible on the inwardly facing side of the hook 25 when the plate 11 is fully inserted into the slot 27.

When the conical screw 23 is inserted into the hole 47 its axial displacement is stopped when its thread abuts the edge of the aperture 47 and thereafter, the screw 23 can be further advanced merely by turning, its thread engaging that edge of the aperture 47 lying closest to the rail 13. Simultaneously the side of the screw 23, situated further from the rail 13 will be resting against the inside of the rounded portion 39 of the hook 25 as if in a cradle and is guided thereby. As the diameter of the screw 23 at the point of engagement increases, the aperture edge and the hook tip are forced further apart and more strongly, until finally the plate edge 21 is clamped tightly and forcefully against the rail 13. The length of the screw 23 is considerably greater than the width of the hook 25 so that in the final position both its ends always protrude beyond the hook 25, irrespective of manufacturing inaccuracies and evenly distribute the reaction forces upon the halves of the hook 25 situated above and below the slot 27. The radius of the cylindrically curved portion 39 of the hook 25 approximately corresponds to the maximum radius of the screw 23 to provide a close fit in the final position. The slot 27 may be of a uniform width, but, as shown in FIG. 3 it is preferable to widen the slot 27 at the centre, whereby the plate edge 21 is more easily guided during its insertion therein and also disassembly is made easier if the plate has been upset or deformed at the edge of the aperture 47.

The attachment device of the invention is fundamentally unchanged if the plate 11, instead of being directly applied against the rail, is applied thereagainst with the inter-position of some other member that is to be securely held fast. Thus the inventive attachment device can be used for the connection of crossing rails of U-shaped profiles, and FIGS. 6 to 8 show examples thereof.

FIG. 6 shows a horizontal U-rail 13 with an aperture 45 and with a hook 25 inserted therein. Into the slot 27 thereof the plate 11 is inserted in a horizontal position within a vertical U-rail 49 and projects partly into an aperture 51 in the web thereof, said aperture 51 being positioned opposite the aperture 45, so that the curved hook portion 39 projects through both of them. When a conical screw 23 is being turned into the aperture 47, the plate 11 is pressed against the edges bordering the aperture 51 of the rail 49 which in its turn is pressed against the edges bordering the aperture 45, so that the two U-rails 13 and 49 are connected together.

FIG. 7 shows an alternative method of connecting two crossing U-rails web-to-web. Here, the plate 11 has a recess 53 at the centre of its inner edge which is large enough to accommodate the profile of the U-rail 49. Two apertures 45 in the rail 13 are provided on opposite sides of the rail 49, and hooks 25 are inserted therethrough. When the plate 11 is inserted into the slots of the hooks, two apertures 47 in the plate 11 will be accessible within the hooks for insertion of conical screws. In this case, the two hooks 25 are shown as parts of a single continuous strip. The rail 49 may be replaced by some arbitrary object that is to be clamped, e.g. a tubular pole, the shape of the recess 53 then being modified.

As shown in FIG. 8 it is possible with a slight modification of the arrangement of FIG. 7 to use the attachment device for the connection of two U-rails having their flanges facing each other. In this case the end portions of the hooks 25 are applied against the outside of the web 15 of the rail 13.

In FIG. 9 the rail is, in addition to web 15 and transverse flanges 17, 19 also provided with inwardly directed flanges 55,57 making the profile almost C-shaped. In this case, the hooks may project from the open side of the profile, and be retained by engagement with the inwardly directed flanges 55, 57, engagement being obtained by widening the end portions 29, 31 of the hook which for the remainder is of the same design as in FIGS. 2 and 3. Such a hook is displaceable without limit along the length of the rail. Possibly, at the same time, hooks may be provided which project in the opposite direction, i.e. through apertures in the rail web 15, as in the embodiments described above.

FIG. 10 shows an alternative in which the end portions 27, 29 of the hook are parallel to each other and are fastened to opposite sides of a block or slide 59 which may be displaceably guided within a similar rail as shown in FIG. 9.

In FIG. 11 a hook 25 of the same design as in FIGS. 2 to 3 is inserted into an aperture 61 in a separate inner rail 63 which is displaceably guided within an outer rail due to engagement of the flanges of the two rails. As in FIGS. 1 to 5 the plate 11 is held fast by a conical screw 23 inserted through the aperture 47 of the plate 11, the straight edge 21 of the plate being pressed against a sheet metal piece 64 bridging the space between the flanges of the outer rail and transferring the pressure thereto, the hook and the inner rail also being locked. Previously the position may have been adjusted along the length of the rail. The sheet metal piece 64 is suspended upon the hook and is preferably T-shaped, the downwardly directed stem being fitted between the inclined parts of the hook 25 and keeping the hook extended and guided prior to the attachment of the plate 11. Similar sheet metal pieces can be used in co-operation with the hooks of FIGS. 9 and 10, but may be dispensed with if the slots therein are made sufficiently deep.

FIGS. 12, 13 and 14 showing parts of an orientation board, shows one pole 71 of three poles interconnected by cross-bars 73 to form a supporting pillar and anchored in the ground, e.g. by a road. By means of an attachment device of the design shown in FIG. 6, a vertical rail 75 is fastened to the cross bar 73. Between said rail 75 and a similar vertical rail upon a second supporting pillar there extend a plurality of horizontal rails 77 parallel to and above each other. These serve to support a series of vertical plates 79 showing text or symbols and which are provided with angled edge flanges 81 and end flanges 82. A series of apertures 83 are cut in these flanges and a series of apertures 87 are cut in the rail 77. Attachment hooks 89 are inserted in all or some of said apertures 87 where they are situated opposite to apertures 83, and conical screws 91 are inserted into the apertures 83 and hooks 89. The design is similar to that shown in FIGS. 1 to 5, but the difference resides in that two superposed flanges 81 with apertures 83 are inserted into the slot of each hook.

FIG. 15 shows attachment to a tubular pole 115 with the use of the same device as in FIG. 11. Enclosed within the rail 101 is an inner rail 103, shown in FIG. 17. FIG. 16 shows how the inner rail 103 is guided displaceably. A plate 107, the edge of which is to be inserted into the slots of the two hooks 105, is attached to an inner rail 109 (see FIG. 18) which is displaceably guided within an outer rail 111, as in FIG. 16. The plate 107 has an arcuate recess 113 meant to be clamped against the tube 115 after the straight edge of the plate 107 has been pushed into the slots of the hooks 105 and fixed by conical screws inserted in the aperture 117 of the plate and in engagement with the hooks 105. The tube is clasped between the opposing flanges of the rails 110 and 111. In addition there may be provided hooks 117, 119 on the outer sides of said hooks for the attachment of signboards or similar.

In the modification shown in FIGS. 19, 20 and 21 the ends of the hooks are united with the rail by being integral with the web thereof. Furthermore, the slot 27 is so deep that the hook is divided into two halves, which may be of slightly different sizes in order to correct the inclination of the conical screw. The hook halves are formed by slitting the web 15 of the rail along longitudinal lines 12, 14, 16, 18, whereupon the strips 20, 22 thus formed, which are free along their longitudinal edges and fixed at their ends, are bent at the lines 24, 26, 28, 30 and the material thereof stretched so as to take the shape shown in FIGS. 19 and 21.

Of course, modifications of the above-described exemplary attachment devices are possible within the scope set forth by the following claims, and the attachment devices may also be used for other technical products than the above-mentioned.

I claim:

1. A combination comprising:
   a plate having an elongated edge, and means defining an opening adjacent said edge;
   a profiled strip having a curved center portion, slot means formed in said center portion for receipt of said plate edge therein, and two end portions; said slot means elongated in a dimension extending toward said end portions;
   rail means for receiving said end portions of said profiled strip, and holding both end portions of said profiled strip in contact therewith;
   conical screw means for insertion through said plate opening for engaging said strip center portion and said means defining said plate opening to effect holding of said plate to said rail in a readily detachable manner, said conical screw means having portions thereof having a diameter substantially less than the minimum cross-sectional dimensions of said opening.

2. A combination as recited in claim 1 wherein said plate edge is dimensioned to fit in said slot means, with said plate disposed in a plane substantially perpendicular to said profiled strip end portions.

3. A combination as recited in claim 2 wherein said strip center part comprises two symmetrical flat portions disposed at an acute angle with respect to each other, and interconnected to each other by a rounded portion, and said flat portions each make an obtuse angle with respect to an end portion.

4. A combination as recited in claim 2 wherein said end portions of said strip are disposed in substantially the same plane, and extend in opposite directions from said center portion.

5. A combination as recited in claim 2 wherein said slot means extend along a longitudinal symmetrical line of said strip center portion, up to said end portions of said strip, and wherein said end portions each make an angle with respect to said center portion.

6. A combination as recited in claim 5 wherein said slot means of said strip center portion has a larger width at the center thereof than at the ends thereof.

7. A combination as recited in claim 2 wherein said slot means of said strip center portion has a larger width at the center thereof than at the ends thereof.

8. A combination as recited in claim 2 wherein said rail includes a web; and further comprising means defining at least one substantially rectangular cutout in said web for providing insertion of said strip center portion therethrough; and wherein said end portions of said strip engage said web on opposite sides of said aperture so that said end portions are supported by said rail web when said strip center portion extends through said pressure.

9. A combination as recited in claim 2 wherein said rail means comprises means for receiving the ends of said strip so that said strip is slideable longitudinally with respect to said rail.

10. A combination as recited in claim 2 wherein said strip center portion has a width less than that of said end portion; and wherein said rail means comprises flanges directed inwardly towards each other and receiving edges of said strip end portions therebetween, with said strip center portion projecting outwardly from said rail means in the area between said flanges.

11. A combination as recited in claim 1 wherein said strip end portions are fixed to said rail means.

12. A combination as recited in claim 1 wherein said rail means is U-shaped in cross-section; and further comprising an inner rail received within said U-shaped rail means, said strip ends being operatively connected to said inner rail.

13. A combination as recited in claim 9 wherein said end portions of said strip are disposed in substantially the same plane, and extend in opposite directions from said center portion.

14. A combination as recited in claim 10 wherein said end portions of said strip are disposed in substantially the same plane, and extend in opposite directions from said center portion; and wherein said slot means extend along a longitudinal symmetrical line of said strip center portion, up to said end portions of said strip, and wherein said end portions each make an angle with respect to said center portion.

15. A combination as recited in claim 9 wherein said strip center part comprises two symmetrical flat portions disposed at an acute angle with respect to each other, and interconnected to each other by a rounded portion, and said flat portions each make an obtuse angle with respect to an end portion.

16. A combination as recited in claim 10 wherein said strip center part comprises two symmetrical flat portions disposed at an acute angle with respect to each other, and interconnected to each other by a rounded portion, and said flat portions each make an obtuse angle with respect to an end portion.

17. A combination as recited in claim 3 wherein said end portions of said strip are disposed in substantially the same plane, and extend in opposite directions from said center portion.

18. A combination as recited in claim 3 wherein said slot means extend along a longitudinal symmetrical line of said strip center portion, up to said end portions of said strip, and wherein said end portions each make an angle with respect to said center portion.

19. A combination as recited in claim 17 wherein said slot means extend along a longitudinal symmetrical line of said strip center portion, up to said end portions of said strip, and wherein said end portions each make an angle with respect to said center portion.

20. A combination as recited in claim 9 wherein said slot means extend along a longitudinal symmetrical line of said strip center portion, up to said end portions of said strip, and wherein said end portions each make an angle with respect to said center portion.

* * * * *